US009426326B2

(12) United States Patent
Bito

(10) Patent No.: US 9,426,326 B2
(45) Date of Patent: Aug. 23, 2016

(54) IMAGE FORMING APPARATUS, METHOD FOR CONTROLLING THE SAME, AND COMPUTER READABLE STORAGE MEDIUM

(71) Applicant: CANON KABUSHIKI KAISHA, Tokyo (JP)

(72) Inventor: Tomohiko Bito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 13/779,548

(22) Filed: Feb. 27, 2013

(65) Prior Publication Data

US 2013/0229689 A1  Sep. 5, 2013

(30) Foreign Application Priority Data

Mar. 2, 2012  (JP) .................................. 2012-046873

(51) Int. Cl.
*G06F 3/12*  (2006.01)
*H04N 1/32*  (2006.01)
*G03G 15/00*  (2006.01)

(52) U.S. Cl.
CPC ....... *H04N 1/32026* (2013.01); *G03G 15/5004* (2013.01); *G03G 15/5083* (2013.01)

(58) Field of Classification Search
CPC .......... H04N 1/32026; G03G 15/5004; G03G 15/5075; Y02B 60/1267
See application file for complete search history.

(56) References Cited

U.S. PATENT DOCUMENTS

| 6,134,401 | A * | 10/2000 | Yun et al. .................. 399/70 |
| 7,239,409 | B2 * | 7/2007 | Parry .......................... 358/1.15 |
| 7,260,730 | B2 * | 8/2007 | Sakaue ........................ 713/310 |
| 2001/0015818 | A1 * | 8/2001 | Kawanabe et al. .......... 358/1.15 |
| 2005/0254082 | A1 * | 11/2005 | Kobayashi ......... H04N 1/00928 358/1.14 |
| 2012/0042065 | A1 * | 2/2012 | Takahashi ..................... 709/224 |

FOREIGN PATENT DOCUMENTS

| CN | 101515975 A | 8/2009 |
| JP | 8-076653 A | 3/1996 |
| JP | 2000-081959 A | 3/2000 |
| JP | 2000-085209 A | 3/2000 |
| JP | 2002-091630 A | 3/2002 |
| JP | 2003-084931 A | 3/2003 |
| JP | 2006-041739 A | 2/2006 |
| JP | 03938133 B2 | 6/2007 |
| JP | 2007288584 A | 11/2007 |
| JP | 04615498 B2 | 1/2011 |

\* cited by examiner

*Primary Examiner* — Marivelisse Santiago Cordero
*Assistant Examiner* — Neil R McLean
(74) *Attorney, Agent, or Firm* — Canon U.S.A., Inc. IP Division

(57) ABSTRACT

An image forming apparatus communicable with an external apparatus includes a reception unit configured to receive from the external apparatus a request for displaying a frame used to operate the image forming apparatus on a display of the external apparatus, an execution unit configured to perform shut down processing of the image forming apparatus when a predetermined time has elapsed, and a control unit configured to prevent the execution unit from performing the shut down processing in a case where the reception unit has received the request before the predetermined time has elapsed.

7 Claims, 8 Drawing Sheets

| USER NAME | ☐ | —501a |
| PASSWORD | ☐ | —501b |

502a — MANAGER LOG-IN
502b — GENERAL USER LOG-IN

FIG.4B

401 RUI

503

LOG-OUT

PRINTER STATE: IN PRINTING
PAPER SUPPLY INFORMATION: ~
TONER INFORMATION: ~

JOB LIST  505

| JOB 1 | PRINT PAGE | 12/19 |
| JOB 2 | PRINT PAGE | 0/9 |
| JOB 3 | PRINT PAGE | 0/2 |

504
JOB LIST

JOB MANIPULATION
INHIBITION SETTING
506

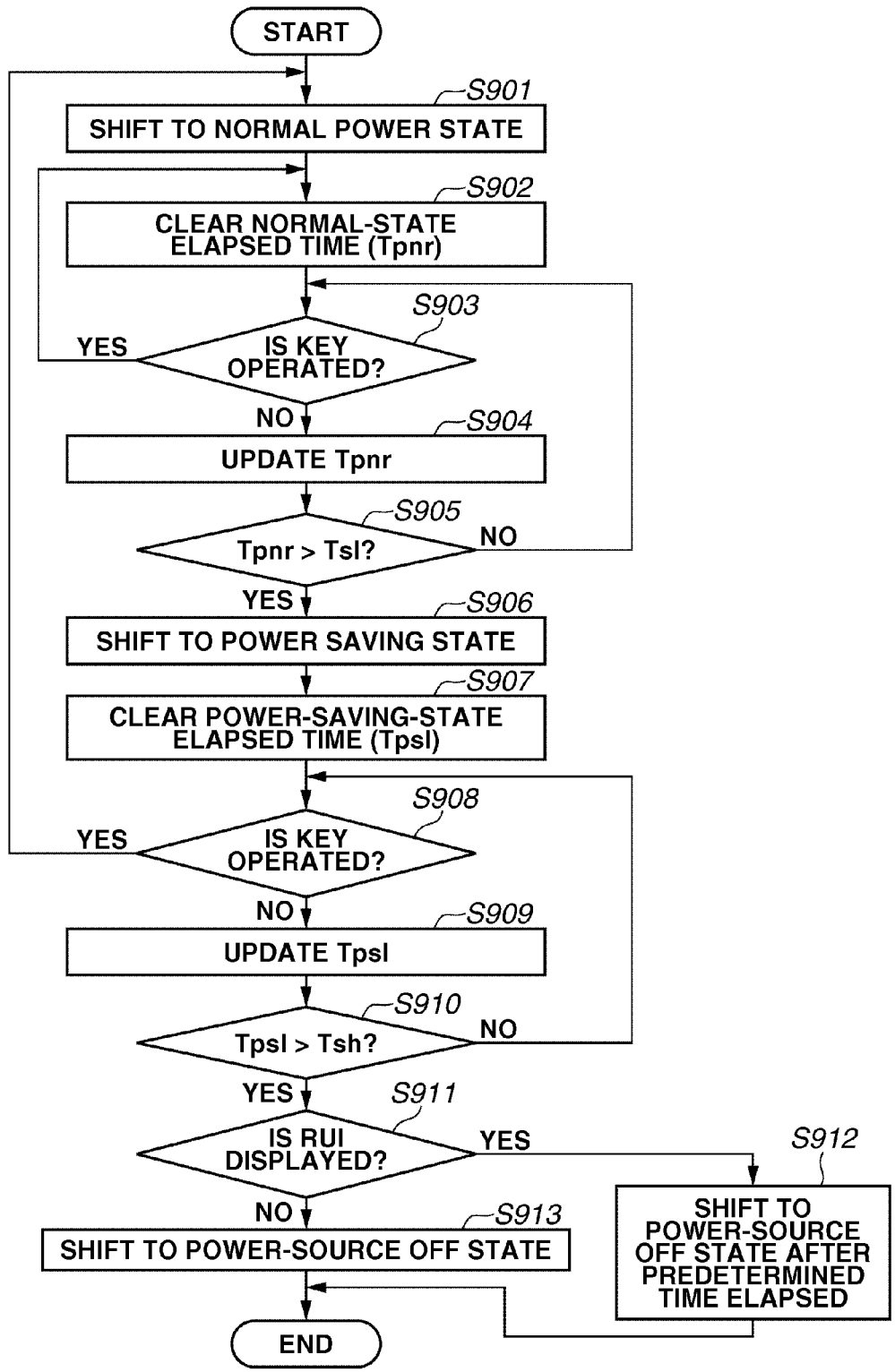

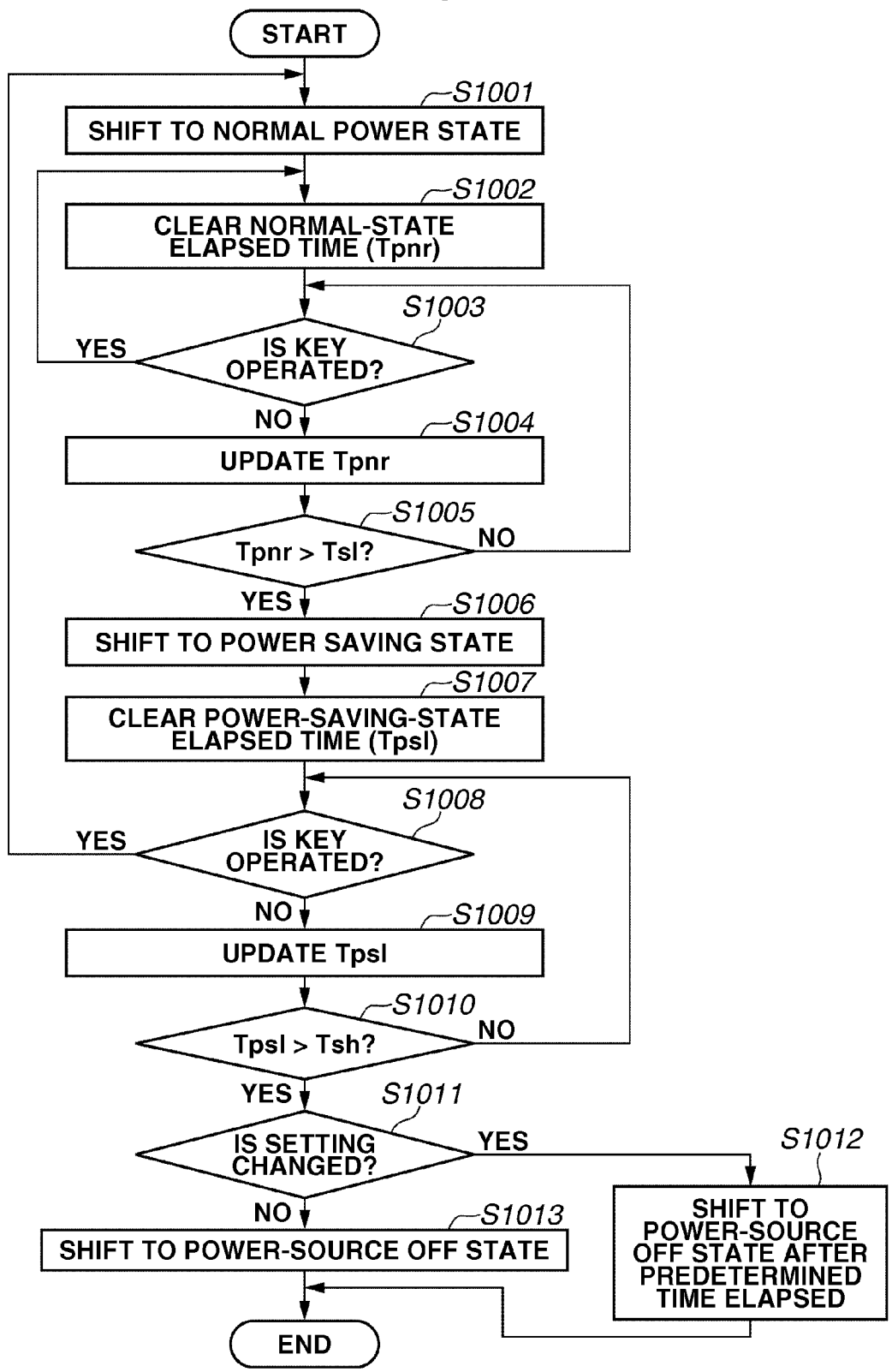

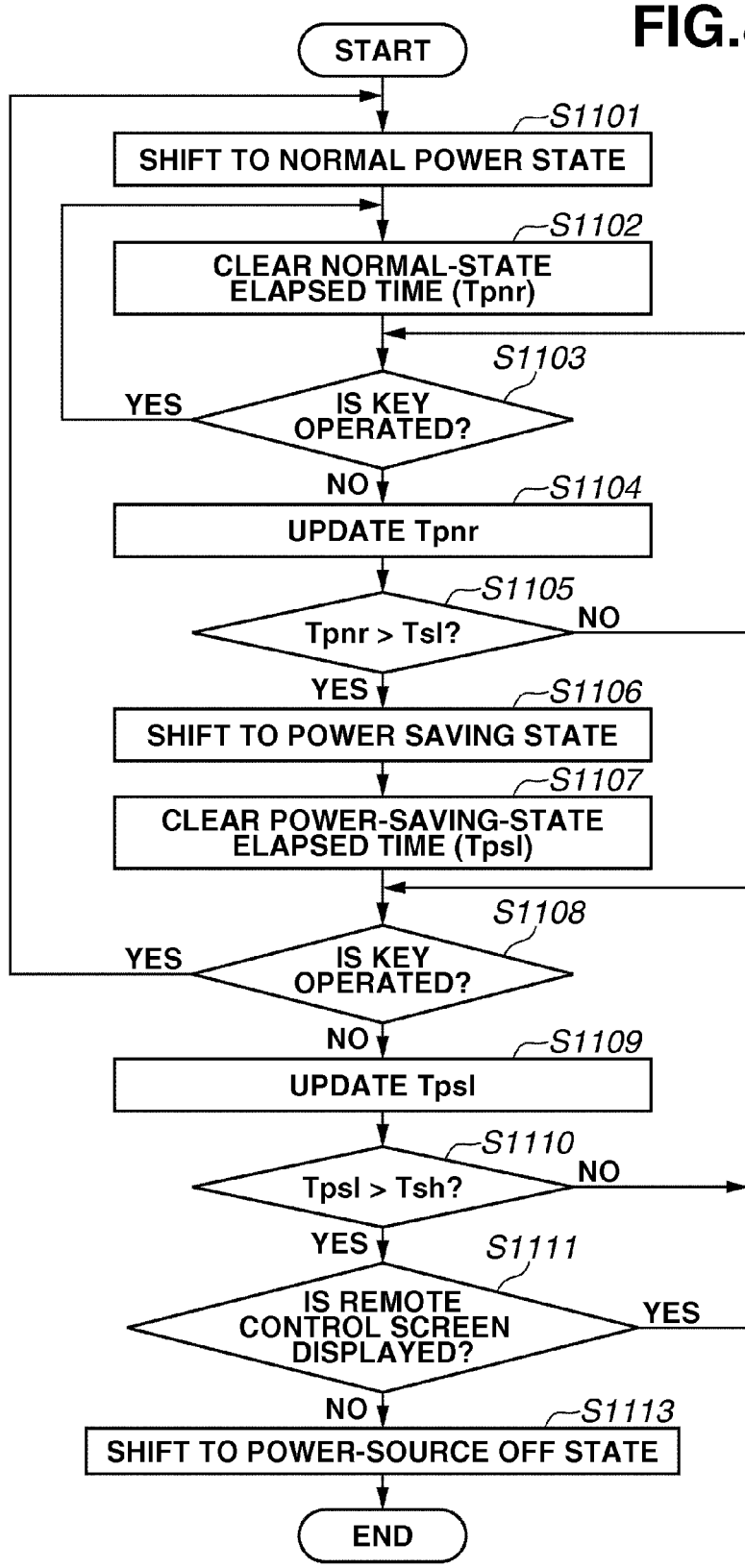

IMAGE FORMING APPARATUS, METHOD FOR CONTROLLING THE SAME, AND COMPUTER READABLE STORAGE MEDIUM

BACKGROUND OF THE INVENTION

1. Field of the Invention

The present invention relates to an image forming apparatus connectable to an external apparatus via a network, a method for controlling the same, and a computer readable storage medium.

2. Description of the Related Art

In recent years, public awareness of power consumption has been increased and an energy saving function is provided for an information processing apparatus such as an image forming apparatus. The following functions are known as the energy saving function: an automatic shutdown function which automatically turns off the power source of the information processing apparatus while a user does not use the information processing apparatus for a predetermined time period (automatic shutdown time); an automatic sleep function which brings the power state of the information processing apparatus into a sleep state (a power state in which a power consumption is smaller than that in a normal state) while the user does not use the information processing apparatus for a predetermined time period (automatic sleep time); and a weekly shutdown function which sets time for each day of the week (weekly shutdown time) and automatically turns off the power source of the information processing apparatus when it reaches the set time.

Japanese Patent Application Laid-Open No. 08-076653 discusses an image processing apparatus provided with an automatic shutdown function which automatically turns off a main power source when a switch mechanism is not newly operated.

A technique is known in which a screen for setting an information processing apparatus (hereinafter referred to as a remote control screen) is displayed on a display unit of a host computer connected to the information processing apparatus via a network to set the information processing apparatus remotely. However, while the information processing apparatus is being set with the remote control screen displayed on the display unit of the host computer, the above automatic shutdown function may be executed, which is problematic.

SUMMARY OF THE INVENTION

According to an aspect of the present invention, an image forming apparatus communicable with an external apparatus includes a reception unit configured to receive from the external apparatus a request for displaying a frame used to operate the image forming apparatus on a display of the external apparatus, an execution unit configured to perform shut down processing of the image forming apparatus when a predetermined time has elapsed, and a control unit configured to prevent the execution unit from performing the shut down processing in a case where the reception unit has received the request before the predetermined time has elapsed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B illustrate remote control screens displayed on a CRT of the host computer.

FIG. 6 is a flow chart illustrating an operation of the printer according to the first exemplary embodiment.

FIG. 7 is a flow chart illustrating an operation of the printer according to a second exemplary embodiment of the present invention.

FIG. 8 is a flow chart illustrating the operation of the printer according to the second exemplary embodiment of the present invention.

DESCRIPTION OF THE EMBODIMENTS

Various exemplary embodiments, features, and aspects of the invention will be described in detail below with reference to the drawings.

[Overall Configuration of Printing System]

Figure 1:
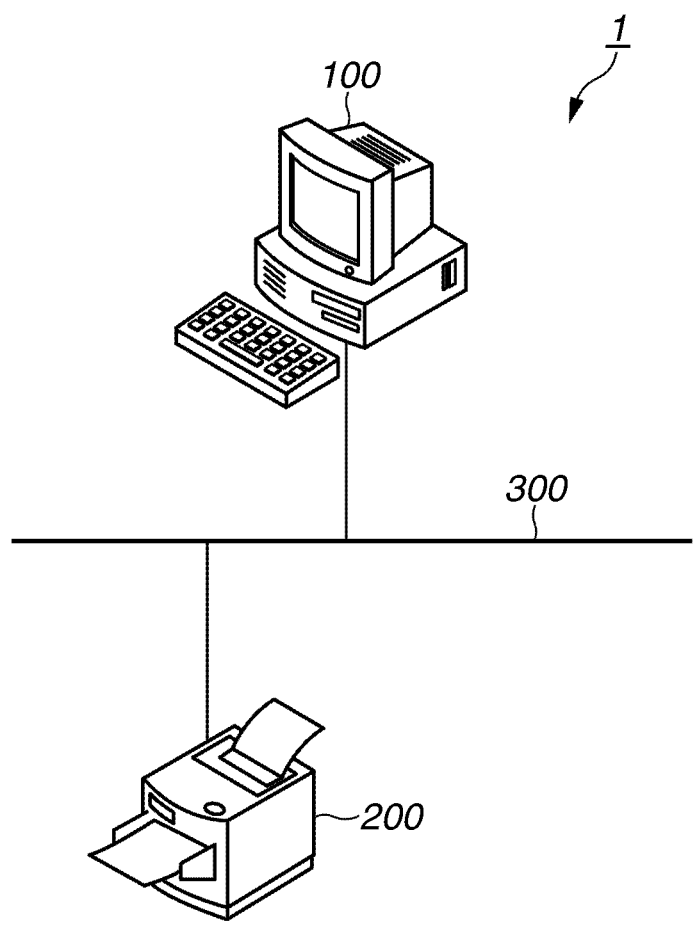
FIG. 1 is an overall schematic diagram illustrating a printing system including a printer according to a first exemplary embodiment and a host computer.

As illustrated in FIG. 1, a printing system 1 according to a first exemplary embodiment of the present invention includes a host computer (external apparatus) 100 (hereinafter referred to as PC 100) and a printer (information processing apparatus or image forming apparatus) 200 connectable to the PC 100 via a network 300.

Figure 2:
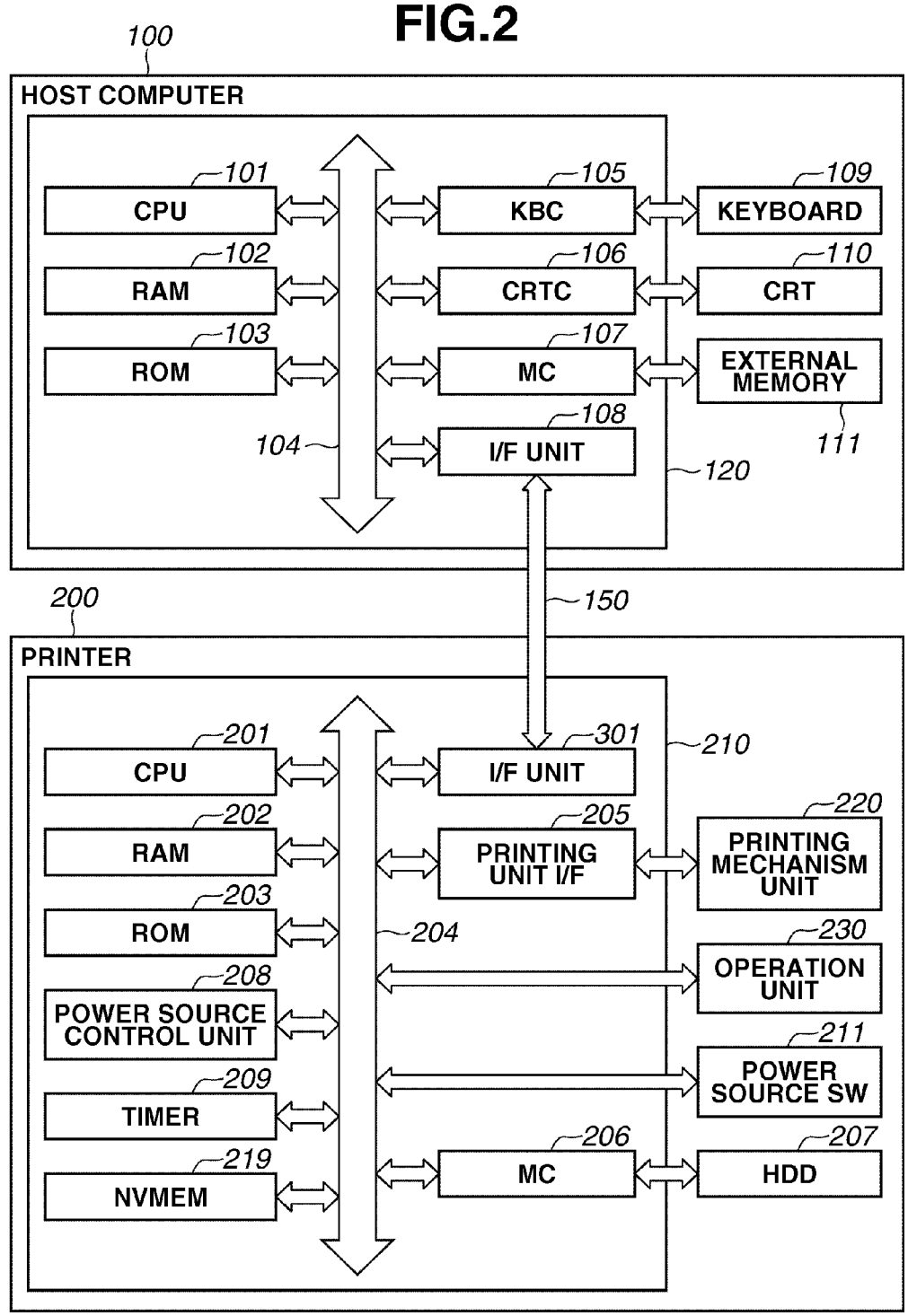
FIG. 2 is a hardware block diagram illustrating the printer and the host computer.

In the printing system 1, the PC 100 communicates with the printer 200 via a bidirectional interface 150 (refer to FIG. 2). The bidirectional interface 150 may be wired such as a local area network (LAN) or a Universal Serial Bus (USB) or wireless such as a wireless LAN. The printer 200 of the printing system 1 includes the automatic shutdown function, the automatic sleep function, and the weekly shutdown function.

[Hardware Configuration of Host Computer]

As illustrated in FIG. 2, the PC 100 includes a controller 120, a keyboard 109, a display monitor (CRT) 110, and an external memory 111.

The controller 120 includes a central processing unit (CPU) 101, a random access memory (RAM) 102, a read only memory (ROM) 103, a keyboard controller (hereinafter referred to as KBC) 105, a cathode-ray tube (CRT) controller (hereinafter referred to as CRTC) 106, a memory controller (hereinafter referred to as MC) 107, and an interface (I/F) unit 108. Each device is connected to a system bus 104.

The CPU 101 controls each device connected to the system bus 104. The CPU 101 performs various data processes based on the program stored in the ROM 103. For example, the CPU 101 executes document processing including figures, images, characters, and tables (including spreadsheet) based on a document processing program stored in the ROM 103.

The CPU 101 loads an outline font into a RAM for display information set on the RAM 102 to realize a "What You See Is What You Get" (WYSIWYG) on the CRT 110. The CPU 101 opens various types of windows based on the command specified by a mouse cursor on the display monitor 110 to execute various data processes.

The RAM. 102 functions as a main memory and a work area of the CPU 101.

The ROM 103 includes a front ROM, a program ROM, and a data ROM. The front ROM stores font data used in the document processing. The program ROM stores not only a control program for controlling the PC 100 but also a program such as a printer selector and a network printer driver. The data ROM stores various data used for document processing.

The KBC 105 controls inputs from the keyboard 109 and a pointing device (not illustrated).

The CRTC 106 controls the display of the display monitor 110.

The MC 107 controls input and output with the external memory 111 such as a hard disk drive (HDD) storing a boot program, various applications, font data, user files, and editing files.

The I/F unit 108 controls communication with the printer 200 via the bidirectional interface 150.

[Hardware Configuration of Printer]

As illustrated in FIG. 2, the printer 200 includes a printer controller 210, a printing mechanism unit 220, an operation unit 230, a HDD 207, and a power source switch 211. The printer 200 is brought into a plurality of power states including a normal power state, power-saving state, and power off state. Details are described below.

In the power off state, the supply of power to the printer controller 210, the printing mechanism unit 220, the operation unit 230, and the HDD 207 is stopped. The shift to the power off state is realized by the user turning off the power source switch 211 or by executing the automatic shutdown function or the weekly shutdown function.

The printer controller 210 includes a CPU 201, a RAM 202, a ROM 203, a I/F unit 301, a printing unit interface (hereinafter referred to as printing unit I/F) 205, an MC unit 206, a power source control unit 208, a timer 209, and a nonvolatile memory (NVMEM) 219. Each device is connected to a system bus 204. The timer 209 is operated by a battery (not illustrated) as a power source.

The CPU 201 controls each device connected to the system bus 204. The CPU 201 executes the control program stored in the ROM 203 to perform data processing. For example, the CPU 201 generates image data to output the image signal related to the image data to the printing mechanism unit 220 via the printing unit I/F 205.

The CPU 201 transmits a control signal to the printing mechanism unit 220 via the printing unit I/F 205. Furthermore, the CPU 201 transmits information about the printer 200 to the PC 100 via the I/F unit 301.

The RAM 202 functions as a main memory and a work memory of the CPU 201. The addition of an option RAM to an extension port (not illustrated) allows the memory capacity of the RAM 202 to be extended. The RAM. 202 functions also as an image data storage area storing a loaded image data, an environmental data storage area storing environmental data, and a nonvolatile (NV) RAM storing various parameters.

The ROM 203 includes a font ROM, a program ROM, and a data ROM. The font ROM stores font data used for generating image data. The program ROM stores a control program executed by the CPU 201. The data ROM stores various data used for processing data.

The I/F unit 301 controls communication with the PC 100 via the bidirectional interface 150.

The printing unit I/F 205 controls communication with the printing mechanism unit 220.

The printing mechanism unit 220 is provided to form an image on a sheet.

The operation unit 230 is an operation panel for performing key input and displaying information and includes a switch and a light emitting diode (LED) display. The operation unit 230 may be formed of a touch panel.

The MC unit 206 controls access to the HDD 207. The HDD 207 stores print data and control programs.

The power source control unit 208 receives a signal from the CPU 201 to control the supply and stop of power to each unit of the printer 200. The power source control unit 208 supplies power to the printer controller 210, the printing mechanism unit 220, the operation unit 230, and the HDD 207 in the normal power state.

The power source control unit 208 stops supplying power to the printer controller 210, the printing mechanism unit 220, the operation unit 230, and the HDD 207 in the power off state. Since the supply of power to the printer controller 210 is stopped in the power off state, the printer 200 cannot communicate with the PC 100

The timer 209 receives a signal transmitted from the CPU 201 to start measuring time.

The power source switch 211 is the one that is operated by the user to supply power to each unit of the printer 200 and stop supplying power thereto. The power source switch 211 is turned on or turned off according to a control signal transmitted from the CPU 201.

The NVMEM 219 is a nonvolatile memory. The NVMEM. 219 stores setting information. The setting information includes a user name, a password, the name of a PC, and an internet protocol (IP) address.

Figure 3:
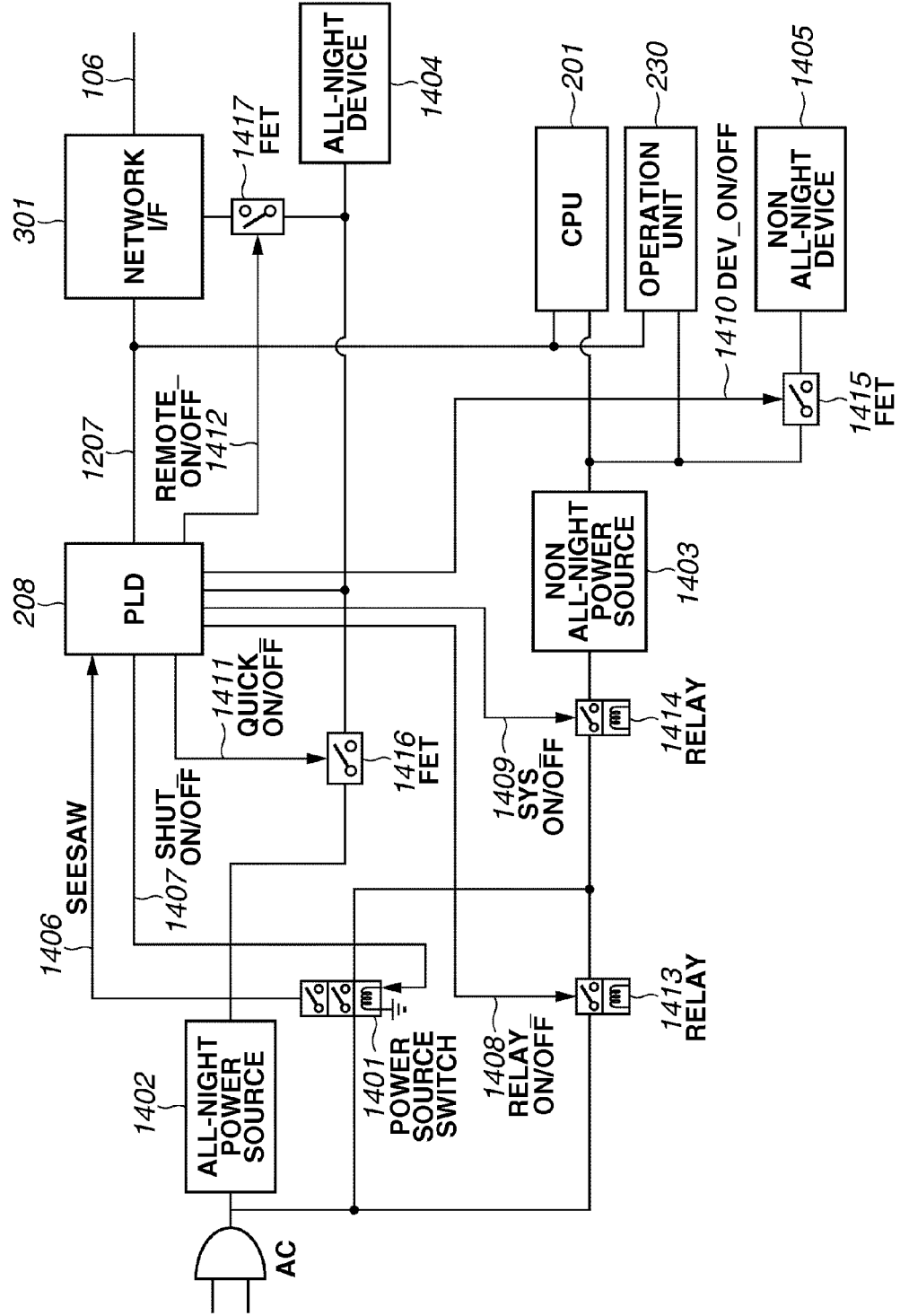
FIG. 3 is a hardware block diagram illustrating a power source switch of the printer and the periphery of the power source switch.

FIG. 3 is a block diagram illustrating an example of configuration of power source of the printer 200. FIG. 3 illustrates a relationship between mainly a power source system and control signals of a power source switch 1401, the power source control unit (a programmable logic device PLD) 208, the network I/F unit 301, the CPU 201, and the operation unit 230 which particularly relate to the feature of the present exemplary embodiment.

The power source control unit 208 and the network I/F unit 301 are connected to a first power source 1402 and the system bus 204 such as a peripheral component interconnect (PCI) bus.

The power source control unit 208 performs switch control of the power source switch 1401, a mechanical relays 1413 and 1414, and field effect transistors (FETs) 1416, 1415, and 1417.

The network I/F unit 301 acts the role of a sub CPU in addition to the above functions. For example, the network I/F unit 301 includes a proxy response function which analyzes packet data from the bidirectional interface 150 and starts a second power source 1403 to transfer control to the CPU 201 (to cause the CPU to wake up) and perform remote-on. The term remote-on is described below. The first power source 1402 supplies power to the power source control unit 208, the network I/F unit 301, and the first devices 1404. The second power source 1403 supplies to the CPU201, the operation unit 230, and the second devices 1405. The first power source 1402 generates power voltage (for example 3.3V). The second power source 1403 generates power voltage (for example 12V).

A SEESAW 1406 is a status signal indicating the state of a seesaw switch of the power source switch 1401. A SHUT_ON/OFF 1407 is an ON/OFF execution signal of the power source switch 1401.

A first device 1404 is another first device such as the RAM 202 and an LED (not illustrated), for example. A second device 1405 is another second device such as the ROM 203, for example.

A RELAY_ON/OFF 1408 is a relay control signal. A SYS_ON/OFF 1409 is a second power source control signal. A DEV_ON/OFF 1410 is a second device control signal. A QUICK_ON/OFF 1411 is a quick start control signal. A REMOTEON_ON/OFF 1412 is a remote-on control signal.

The power source control operation of the printer 200 is described below.

The image forming apparatus according to the present exemplary embodiment includes power source states such as not only the above standby state and the sleep state but also a remote-off state and a shutdown state which are described below.

The remote-off state can be returned to the standby state by a remote control. This operation is referred to as "remote-on" in the present exemplary embodiment. Shifting the image forming apparatus from the standby state or the sleep state to the remote-off state by the remote control is referred to as "remote-off." Shifting the image forming apparatus to the shutdown state is referred to as "shutdown." The shutdown state can be returned to the standby state only by turning on the power source switch 1401. The following describes the power source control operations of the above states.

[Sleep Shift Control]

If neither the operation unit 230 is operated nor a job is received via the network I/F unit 301 for a predetermine period of time, the CPU 201 executes a sleep shift control. In executing the sleep shift control, the CPU 201 ends a system operation and executes an ending sequence (shutdown of the second device 1405).

The CPU 201 notifies the power source control unit 208 of a remote-off control command via the system bus 204. The power source control unit 208 performs the off-control of the DEV_ON/OFF 1410 and SYS_ON/OFF 1409 in response to the notification. Thereafter, the power source control unit 208 performs the off-control of the RELAY_ON/OFF 1408 to cut off a mechanical relay 1413.

In the sleep state, the power source control unit 208, the network I/F unit 301, and the first device 1404 in the printer 200 are energized. The network I/F unit 301 can perform a proxy response to the signal received via the LAN 106.

[Remote-off Control]

In executing the remote-off command, the CPU 201 ends the system operation and executes the ending sequence (shutdown of the second device 1405). The CPU 201 notifies the power source control unit 208 of the remote-off control command via the system bus 204.

The power source control unit 208 performs the off-control of the DEV_ON/OFF 1410 and SYS_ON/OFF 1409 in response to the notification. Thereafter, the power source control unit 208 performs the off-control of the SHUT_ON/OFF 1407 and RELAY_ON/OFF 1408 to switch the power source switch 1401 to an "off" side, cutting off a mechanical relay 1413.

In the remote-off state, the power source control unit 208, the network I/F unit 301, and the first device 1404 in the printer 200 are energized. The network I/F unit 301 can respond only to two types of command signals of the remote-on and shut-down commands. In other words, the network I/F unit 301 in the remote-off state may perform the determination of a power-source control command simply using a matching circuit and a switching circuit. The remote-off state is different in the above point from the sleep state.

The network I/F unit 301 in the remote-off state energizes only blocks for responding only to the two types of command signals of the remote-on and shut-down commands and cuts off energizing other blocks in the network I/F unit 301. For this reason, the network I/F unit 301 can operate at lower power consumption in the remote-off state than in the sleep state.

In the remote-off state, an LED (not illustrated) of the first device 1404 may be lit to indicate the remote-off state (to notify an operator of the remote-off state). This allows the user to easily recognize that the image forming apparatus is in the remote-off state.

[Remote-on Control]

A CPU (not illustrated) of the network I/F unit 301 receives a remote-on signal and notifies the power source control unit 208 of a power-source-on command via the system bus 204. The power source control unit 208 turns on the RELAY_ON/OFF 1408 and SYS_ON/OFF 1409 in response to the notification to energize the CPU 201 and the operation unit 230.

After the CPU 201 is started, the CPU (not illustrated) of the network I/F unit 301 notifies the CPU 201 that the remote-on signal is received. The CPU 201 is notified thereof and executes the remote-on command.

In executing the remote-on command, the CPU 201 notifies the power source control unit 208 of the remote-on control command via the system bus 204. The power source control unit 208 is notified and performs the on-control of the DEV_ON/OFF 1410, the SHUT_ON/OFF 1407, and the RELAY_ON/OFF 1408 which are not turned on to energize the second device 1405, turning on the power source switch 1401.

[Shutdown Control by Remote Control]

In executing the shutdown command, the CPU 201 ends the system operation and executes the ending sequence (shutdown of the second device 1405). The CPU 201 notifies the power source control unit 208 of the remote-off control command via the system bus 204.

The power source control unit 208 performs the off-control of the DEV_ON/OFF 1410, the SYS_ON/OFF 1409, and the REMOTEON_ON/OFF 1412 in response to the notification. Thereafter, the power source control unit 208 performs the off-control of the SHUT_ON/OFF 1407 and the RELAY_ON/OFF 1408 to cut off the power source switch 1401 and the mechanical relay 1413.

In the shutdown state, only the power source control unit 208 and the first device 1404 in the printer 200 are energized. The network I/F unit 301 is not operated, so that the power source control unit 208 and the first device 1404 cannot receive any communication command via the LAN 106.

In receiving the shutdown signal in the remote-off state, the CPU (not illustrated) of the network I/F unit 301 notifies the power source control unit 208 of the power-on command via the system bus 204.

The power source control unit 208 turns on the RELAY_ON/OFF 1408 and the SYS_ON/OFF 1409 in response to the notification to energize the CPU 201 and the operation unit 230. After the CPU 201 is started, the CPU (not illustrated) of the network I/F unit 301 notifies the CPU 201 that the remote-on signal is received. The CPU 201 is notified and executes the remote-on command.

[Shutdown Control by Power Source Switch]

When the user turns off the seesaw switch of the power source switch 1401, the power source switch 1401 inputs the SEESAW 1406 to the power source control unit 208. If the printer 200 is in the standby state, the power source control unit 208 notifies the CPU 201 that the power source switch 1401 is turned off via the system bus 204 in response to the notification. The above shutdown command is executed according to the notification.

When the user turns off the seesaw switch of the power source switch 1401 in the remote-off state, the power source control unit 208 turns on the RELAY_ON/OFF 1408 and the SYS_ON/OFF 1409 to energize the CPU 201 and the operation unit 230. After the CPU 201 is started, the power source control unit 208 notifies the CPU 201 that the power source switch 1401 is turned off. The CPU 201 is notified and executes the shutdown command.

[Power State of Printer]

The printer 200 according to the present exemplary embodiment is brought into any of a normal power state, a power-saving state, and a power off (a specific power state and off state). If the power source switch 211 described above is turned on or a print processing is being executed, the printer 200 is brought into the normal power state. If the following two conditions are satisfied, the printer 200 in the normal power state is shifted from the normal power state to the power-saving state.

Condition 1: the key of the operation unit 230 is not operated for a certain period of time (Ts1). Condition 2: a job is not provided from an external apparatus such as the PC 100 for a certain period of time (Ts1).

If the following two conditions are satisfied, the printer 200 in the power-saving state is shifted from the power-saving state to the power off state. Condition 3: the key of the operation unit 230 is not operated for a certain period of time (Tsh). Condition 4: a job is not provided from an external apparatus such as the PC 100 for a certain period of time (Tsh). In the normal power state, power is supplied to each unit of the printer 200.

In the power-saving state, power is supplied to the I/F 205, the power source control unit 208, the timer 209, the NVMEM 219, and the power source switch 211, however, power is not supplied to the CPU 201, the RAM 202, the ROM 203, the printing mechanism unit 220, and the HDD 207.

In the power off state, the supply of power to each unit of the printer 200 is stopped. Incidentally, in the power off state, even if the supply of power to each unit of the printer 200 is stopped, the power consumption of the printer 200 does not necessarily have to be zero watts in a strict sense.

[Description of Remote Control Screen]

FIGS. 4A and 4B are schematic diagrams illustrating remote control screens displayed on the CRT 110 of the PC 100. FIG. 4A is a log-in screen 500 which first appears when the printer 200 is accessed from the PC 100.

The user inputs a user name and a password into a user name input section 501a and a password input section 501b of the log-in screen 500 respectively and presses a manager log-in button 502a to transmit the input user name and password to the printer 200.

The printer 200 collates the received user name and password with the user name and password included in the setting information stored in the NVMEM 219 to determine whether both the information agrees with each other. If it is determined that the received user name and password agree with the user name and password included in the setting information, the manager is permitted to log in the printer 200. Thus, the printer 200 is shifted to a manager mode.

If a general user excluding the manager wants to log in the printer 200, the general user has only to press a general user log-in button 502b without inputting the user name and the password. This permits the general user to log in the printer 200. Thus, the printer 200 is shifted to a general user mode.

If the manager logs in the printer 200 or the general user logs in the printer 200, in either case, the PC 100 transmits the name and the IP address of the PC 100 to the printer 200. The printer 200 stores the received name and the IP address thereof in the NVMEM 219 until notified by the PC 100 of log out.

As described above, a remote control screen 401 is a web browser based application, so that the remote control screen 401 receives hypertext markup language (HTML) data generated by the printer 200 and displays the state of the printer 200 on the web browser.

FIG. 4B illustrates an example of a manager mode screen 510 displayed on the CRT 110 of the PC 100 if the manager succeeds in logging in via the log-in screen 500 in FIG. 4A. A log-out button 509 of the manager mode screen 510 is pressed to close the manager mode screen 510.

A status display section 503 displays the present state of the printer 200 and information about paper feeding and toner. A job list button 504 is pressed to display a present job list 505 of the printer 200 on the status display section 503. The user logging in as a manager selects a job displayed on the job list 505 and can request the printer 200 to perform a predetermined operation such as cancel of a job.

For example, a job is selected to shift a screen to the screen on which more detailed information is displayed related to the selected job (such as the number of pages, job input time, and user name) and to allow canceling the job on the shifted screen.

In the present exemplary embodiment, a job manipulation inhibition setting button 506 is displayed only on the manager mode screen 510 and the user logging in as a manager can press the job manipulation inhibition setting button 506. Specifically, in the present exemplary embodiment, a specific operation which cannot be executed in the general user mode (for example, a manipulation inhibition setting such as cancel of the job) can be performed in the manager mode.

[A Series of Processing Executed in Printing System]

Figure 5:
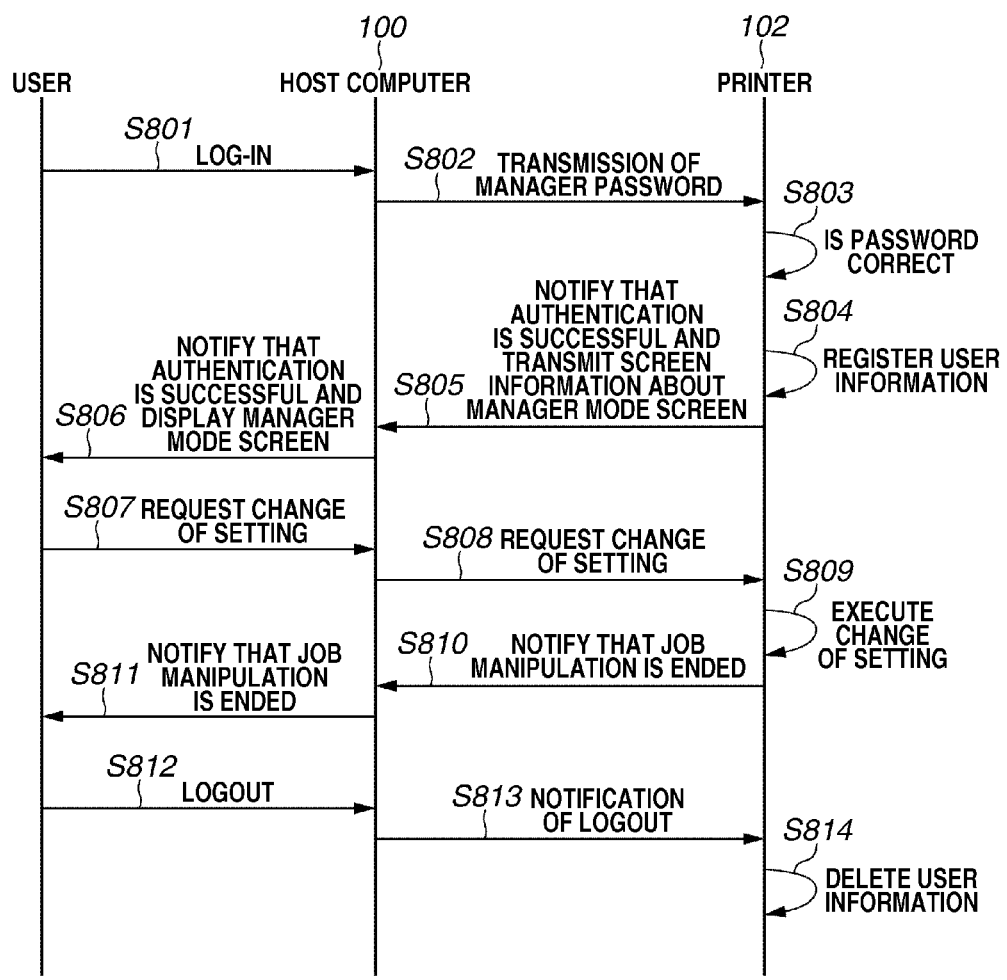
FIG. 5 is a diagram illustrating an outline of a series of processing between the printer and the host computer.

A series of processing executed in the printing system 1 is described below with reference to FIG. 5.

The CPU 101 of the PC 100 accesses the printer 200 according to the operation of the user. The CPU 101 of the PC 100 displays the log-in screen 500 on the CRT 110 based on setting information received via the I/F unit 108. The setting information is stored in the NVMEM 219 of the printer 200.

In step S801, the user inputs the user name and the password in the log-in screen 500. In step S802, the CPU 101 causes the I/F unit 108 to transmit the input user name and password. Thereby, the user name and the password are transmitted to the printer 200.

The printer 200 receiving the user name and the password authenticates the user. More specifically, in step S803, the CPU 201 of the printer 200 determines whether the user name and the password stored in the NVMEM 219 agree with the received user name and password.

If the user name and the password stored therein agree with the received ones, in step S804, the CPU 201 stores the received PC name and IP address (hereinafter referred to as user information). In step S805, the CPU 201 causes the I/F unit 301 to transmit success in authentication. This notifies the PC 100 of success in authentication. Also in step S805, the CPU 201 causes the I/F unit 301 to transmit the screen information about the manager mode screen 510.

If the CPU 201 determines that the user name and the password stored in the NVMEM 219 do not agree with the received user name and password (in other words, in case of failure in authentication), the CPU 201 notifies the PC 100 of failure in authentication.

In step S806, the CPU 101 of the PC 100 notified by the printer 200 of success in authentication causes the CRT 110 to display the manager mode screen 510 based on the screen information about the manager mode screen 510. In step S807, the user changes setting of the printer 200 on the screen 510. In step S808, the CPU 101 causes the I/F unit 108 to transmit request for changing the setting. This transmits the request for changing the setting from the PC 100 to the printer 200.

In step S809, when the printer 200 is requested to change the setting by the PC 100, the CPU 201 operates according to the request. As an example of change of the setting described above, if a time (Tsh) required until an automatic shutdown function is executed is changed, the CPU 201 executes the change of value of the time (Tsh). At this point, the CPU 201 stores a flag indicating that the setting is changed (hereinafter referred to as a setting change flag) in the NVMEM 219.

In step S810, the CPU 201 completes the processing executed according to the received request and then causes the I/F unit 301 to transmit notification of completion. This transmits notification of completion indicating that the request made by the PC 100 is completed to the PC 100. In step S811, the CPU 201 causes the manager mode screen 510 to display that the request is completed.

In step S812, in a case where the user logs out from the printer 200, the user presses the log-out button, thereby the CPU 101 causes the I/F unit 108 to transmit notification of log-out. In step S813, this transmits notification of log-out to the printer 200. The CPU 101 causes the CRT 110 to display the log-in screen 500 that is an initial screen.

In step S814, the CPU 201 of the printer 200 notified of log-out deletes user information (PC name and IP address) stored in the NVMEM 219. In other words, the NVMEM 219 stores the PC name and IP address of the PC 100 only while the user is logging in the printer 200.

[Description of Operation of Printer]

A process in which the printer 200 is brought into the power off state by the automatic shutdown function is described below with reference to FIG. 6. The control method is executed by the CPU 201 of the printer 200 executing a program based on a flow chart illustrated in FIG. 6.

The power source switch 211 of the printer 200 is turned on to energize the CPU 201. The CPU 201 switches a port to supply power to the printing mechanism unit 220 and the operation unit 230. Thereby, in step S901, the printer 200 is brought into the normal power state. In step S902, the CPU 201 initializes (set to zero) a numeric value of a normal-state elapsed time (Tpnr) stored in the data area of the ROM 203.

In steps S903 to S905, the CPU 201 determines whether the above conditions 1 and 2 are satisfied. Specifically, in step S903, the CPU 201 determines whether the key of the operation unit 230 is operated and a job is provided from the I/F unit 301.

If the key of the operation unit 230 is not operated and the job is not provided from the I/F unit 301 (NO in step S903), the CPU 201 executes the processing in step S904. If the key of the operation unit 230 is operated and the job is provided from the I/F unit 301 (YES in step S903), the CPU 201 executes the processing in step S902.

If the CPU 201 determines that the key of the operation unit 230 is not operated and the job is not provided from the I/F unit 301 (NO in step S903), in step S904, the CPU 201 updates the numeric value of the normal-state elapsed time (Tpnr) stored in the data area of the ROM 203. In step S905, the CPU 201 compares the numeric value of a power-saving state shift time (Ts1) with the numeric value of the normal-state elapsed time (Tpnr) which are previously stored in the data area of the ROM 203.

If the CPU 201 determines that the normal-state elapsed time (Tpnr) is not greater than the automatic sleep time (Ts1) (Tpnr≤Ts1) (NO in step S905), the CPU 201 executes the processing in step S903.

On the other hand, if the CPU 201 determines that the normal-state elapsed time (Tpnr) is greater than the automatic sleep time (Ts1) (Tpnr>Ts1) (YES in step S905), the CPU 201 switches the port not to supply power to the printing mechanism unit 220 and the operation unit 230. Thereby, in step S906, the printer 200 is brought into the power-saving state. In step S907, the CPU 201 initializes (set to zero) the numeric value of a power-saving state elapsed time (Tps1) stored in the data area of the ROM 203.

In steps S908 to S910, the CPU 201 determines whether the above conditions 3 and 4 are satisfied. Specifically, in step S908, the CPU 201 determines whether the key of the operation unit 230 is operated and a job is provided from the I/F unit 301.

If the key of the operation unit 230 is not operated and the job is not provided from the I/F unit 301 (NO in step S908), the CPU 201 executes the processing in step S909. On the other hand, if the key of the operation unit 230 is operated and the job is provided from the I/F unit 301 (YES in step S908), the CPU 201 executes the processing in step S902.

If the CPU 201 determines that the key of the operation unit 230 is not operated and the job is not provided from the I/F unit 301 (NO in step S908), in step S909, the CPU 201 updates the numeric value of the power-saving state elapsed time (Tps1) stored in the data area of the ROM 203. In step S910, the CPU 201 compares the numeric value of the automatic shutdown time (Tsh) with the numeric value of the power-saving state elapsed time (Tps1) which are previously stored in the data area of the ROM 203.

If the CPU 201 determines that the power-saving state elapsed time (Tps1) is not greater than the automatic shutdown time (Tsh) (Tps1≤Tsh) (a shift condition is satisfied) (NO in step S910), the CPU 201 executes the processing in step S908.

On the other hand, if the CPU 201 determines that the power-saving state elapsed time (Tps1) is greater than the automatic shutdown time (Tsh) (Tps1>Tsh) (YES in step S910), in step S911, the CPU 201 determines whether the remote control screen (the manager mode screen 510) is displayed on the CRT 110 of the PC 100. More specifically, the CPU 201 determines whether the screen information of the manager mode screen 510 stored in the NVMEM 219 is transmitted.

If the CPU 201 determines that the remote control screen is displayed on the CRT 110 (YES in step S911), in step S912, the CPU 201 turns off the power source switch 211 after the elapse of a predetermined time period. In other words, the CPU 201 does not immediately turn off the power source switch 211. This shifts the power state of the printer 200 to the power off state.

If the CPU 201 determines that the remote control screen is not displayed on the CRT 110 (NO in step S911), in step S913, the CPU 201 immediately turns off the power source switch 211 (executes shift processing). Incidentally, the CPU 201 determines that the remote control screen is not displayed on the CRT 110 if the CPU 201 does not transmit the screen information of the manager mode screen 510 stored in the NVMEM 219. This shifts the power state of the printer 200 to the power off state.

The first exemplary embodiment describes an example in which the automatic shutdown function is executed after the elapse of a predetermined time period if the remote control screen is displayed on the CRT 110, however the present invention is not limited to the present exemplary embodiment. A second exemplary embodiment describes an example in which the automatic shutdown function is executed after the elapse of a predetermined time period if the setting of the printer 200 is changed via the remote control screen. The second exemplary embodiment is similar to the first exemplary embodiment in the printer configuration, so that description thereof is omitted.

A process in which the printer 200 according to the second exemplary embodiment is brought into the power off state by the automatic shutdown function is described below with reference to FIG. 7. The control method is executed by the CPU 201 of the printer 200 executing a program based on a flow chart illustrated in FIG. 7.

The processes from steps S1001 to 1010 are similar to those from steps S901 to S910 of the first exemplary embodiment, so that the description thereof is omitted.

If the CPU 201 determines that the power-saving state elapsed time (Tps1) is greater than the automatic shutdown time (Tsh) (Tps1>Tsh) (the shift condition is satisfied) (YES in step S1010), in step S1011, the CPU 201 determines whether the setting of the printer 200 is changed via the remote control screen.

More specifically, the CPU 201 determines whether the setting change flag to be stored in the NVMEM 219 is stored. If the setting change flag is stored therein, the CPU 201 determines that the setting of the printer 200 is changed via the remote control screen. If the CPU 201 determines that the setting of the printer 200 is changed via the remote control screen (YES in step S1011), in step S1012, the CPU 201 turns off the power source switch 211 after the elapse of a predetermined time period. This shifts the power state of the printer 200 to the power off state.

On the other hand, if the CPU 201 determines that the setting of the printer 200 is not changed via the remote control screen (NO in step S1011), in step S1013, the CPU 201 immediately turns off the power source switch 211 (executes shift processing). This shifts the power state of the printer 200 to the power off state.

The first exemplary embodiment describes an example in which the automatic shutdown function is executed after the elapse of a predetermined time period if the remote control screen is displayed on the CRT 110, however the present invention is not limited to the present exemplary embodiment. In other words, a third exemplary embodiment describes an example in which the automatic shutdown function is not executed while the remote control screen is being displayed on the CRT 110. The third exemplary embodiment is similar to the first exemplary embodiment in the printer configuration, so that the description thereof is omitted.

A process in which the printer 200 according to the third exemplary embodiment is brought into the power off state by the automatic shutdown function is described below with reference to FIG. 8. The control method is executed by the CPU 201 of the printer 200 executing a program based on a flow chart illustrated in FIG. 8.

The processes from steps S1101 to S1110 are similar to those from steps S901 to S910 of the first exemplary embodiment, so that the description thereof is omitted.

If the CPU 201 determines that the power-saving state elapsed time (Tps1) is greater than the automatic shutdown time (Tsh) (Tps1>Tsh) (the shift condition is satisfied) (YES in step S1110), in step S1111, the CPU 201 determines whether the remote control screen (the manager mode screen 510) is displayed on the CRT 110. More specifically, the CPU 201 determines whether the screen information of the manager mode screen 510 stored in the NVMEM 219 is transmitted.

If the CPU 201 determines that the remote control screen is displayed on the CRT 110 (YES in step S1111), in step S1108, the CPU 201 determines whether a signal is input from the operation unit 230 and the I/F unit 301.

If the CPU 201 determines that the remote control screen is not displayed on the CRT 110 (NO in step S1111), in step S1113, the CPU 201 turns off the power source switch 211 (executes the shift processing). This shifts the power state of the printer 200 to the power off state.

It is to be understood that the above discussed exemplary embodiments are just examples in all respects and are not restrictive. The scope of the present invention is indicated not by the description of the above exemplary embodiments but by the scope of claims and includes all changes in the meaning and the scope equivalent to the scope of claims.

The first and second exemplary embodiments have described examples in which the automatic shutdown function is executed after the elapse of a predetermined time period if the remote control screen is displayed and the setting of the printer 200 is changed via the remote control screen, however, the present invention is not limited to the above exemplary embodiments.

In the present invention, the weekly shutdown function may be executed after the elapse of a predetermined time period if the remote control screen is displayed and the setting of the printer 200 is changed via the remote control screen.

A printer communicable with an external apparatus according to a modification of the present invention includes a shift unit for executing a shift processing for shifting the power state of the printer to a specific power state if a shift condition for shifting the power state of the printer to the specific power state is satisfied, a timer for counting time, and a control unit for performing control so that the shift unit does not execute the shift processing before the elapse of a predetermined time period if a screen for setting an information processing apparatus is displayed on the display unit of the external apparatus in a case where the time counted by the timer reaches a predetermined time (a weekly shutdown time).

The second exemplary embodiment has described the example in which the automatic shutdown function is executed after the elapse of the predetermined time period if the setting of the printer 200 is changed via the remote control screen displayed on the CRT 110 of the PC 100, however, the present invention is not limited thereto.

The printer according to the modification of the second exemplary embodiment may execute the automatic shutdown function after the elapse of the predetermined time period only if a specific setting of the printer 200 is changed (for example, a setting of time at which power is turned off is changed).

More specifically, according to the modification thereof, the automatic shutdown function is not executed after the elapse of the predetermined time period in all cases where the setting of the printer 200 are changed via the remote control screen but the automatic shutdown function is executed after the elapse of the predetermined time period or the automatic shutdown function is not executed only if the specific setting of the printer 200 is changed.

The first exemplary embodiment has described the example in which the automatic shutdown function is executed after the elapse of the predetermined time period if the remote control screen is displayed, however, the present invention is not limited thereto. In other words, the printer according to the modification of the present invention may execute the automatic shutdown function after the elapse of the predetermined time period if the user logs in the printer 200 in a specific mode via the remote control screen.

The specific mode refers to the above manager mode, for example. In other words, the printer according to the modification executes the automatic shutdown function after the elapse of the predetermined time period or does not execute the automatic shutdown function while the user name and the password are stored in the NVMEM 219.

The first exemplary embodiment has described the example in which the automatic shutdown function is executed after the elapse of the predetermined time period if the manager mode screen 510 is displayed as the remote control screen, however, the present invention is not limited thereto. In other words, the automatic shutdown function may be executed after the elapse of the predetermined time period if the log-in screen 500 is displayed as the remote control screen.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-046873 filed Mar. 2, 2012, which is hereby incorporated by reference herein in its entirety.

What is claimed is:

1. An image forming apparatus comprising:
    a communicating portion configured to communicate with an external apparatus and being capable of executing a first process of transmitting information related to an input screen to the external apparatus so as to cause a web browser of the external apparatus to display the input screen prompting an input of information and a second process of receiving image information from the external apparatus;
    an image forming portion configured to form an image based on the image information;
    a power supplying portion capable of being in a plurality of states including a first state in which the power supplying portion supplies power to the image forming portion so as to enable the image forming portion to be able to form an image and supplies power to the communicating portion so as to enable the communicating portion to be able to perform communication, a second state in which the power supplying portion does not supply power to the image forming portion so as to cause the image forming portion to be unable to form an image and supplies power to the communicating portion so as to enable the communicating portion to be able to perform communication, and a third state in which the power supplying portion does not supply power to the image forming portion so as to cause the image forming portion to be unable to form an image and does not supply power to the communicating portion so as to cause the communicating portion to be unable to perform communication;
    a first executing unit configured to execute a third process of shifting a state of the power supplying portion from the second state to the first state, wherein the first executing unit does not execute the third process in a case where the communicating portion executes the first process when the power supplying portion is in the second state, and executes the third process in a case where the communicating portion executes the second process when the power supplying portion is in the second state; and
    a second executing unit configured to execute a fourth process of shifting a state of the power supplying portion from the second state to the third state in a case where the power supplying portion remains in the second state for a predetermined period of time, wherein the second executing unit does not execute the fourth process until a predetermined time passes since the execution of the first process.

2. The image forming apparatus according to claim 1, wherein, in a case where a condition for executing the fourth process is satisfied during a period of time from when the first process is executed until when the predetermined time passes since the execution of the first process, the second executing unit executes the fourth process after the predetermined time passes since the execution of the first process.

3. The image forming apparatus according to claim 1, wherein the input screen is a setting screen prompting an input of setting information of the image forming apparatus.

4. The image forming apparatus according to claim 1, wherein the input screen is an authentication screen prompting an input of authentication information.

5. The image forming apparatus according to claim 1, further comprising an operating portion configured to be operated by a user,
    wherein the first executing unit executes the third process in a case where the operating portion has been operated when the power supplying portion is in the second state.

6. A method for controlling an image forming apparatus comprising an image forming portion configured to form an image based on image information, a communicating portion configured to communicate with an external apparatus, and a power supplying portion capable of being in a plurality of states including a first state in which the power supplying portion supplies power to the image forming portion and supplies power to the communicating portion, a second state in which the power supplying portion does not supply power to the image forming portion and supplies power to the communicating portion, and a third state in which the power supplying portion does not supply power to the image forming portion and does not supply power to the communicating portion, the method comprising:
    executing a first process of transmitting information related to an input screen to the external apparatus with the communicating portion so as to cause a web browser of the external apparatus to display the input screen prompting an input of information;
    executing a second process of receiving image information from the external apparatus with the communicating portion;

executing a third process of shifting a state of the power supplying portion from the second state to the first state in a case where the communicating portion executes the second process when the power supplying portion is in the second state, wherein the third process is not executed in a case where the communicating portion executes the first process when the power supplying portion is in the second state; and executing a fourth process of shifting a state of the power supplying portion from the second state to the third state in a case where the power supplying portion remains in the second state for a predetermined period of time, wherein the fourth process is not executed until a predetermined time passes since the execution of the first process.

7. A non-transitory computer readable storage medium storing a program for causing a computer to execute the method for controlling the image forming apparatus according to claim 6.

* * * * *